US005563704A

United States Patent [19]
Fitzpatrick

[11] Patent Number: 5,563,704
[45] Date of Patent: Oct. 8, 1996

[54] CAMERA AND METHOD FOR HOLOGRAPHIC INTERFEROMETRY USING AN ERASABLE PHOTOSENSITIVE PHOTOPOLYMER FILM

[76] Inventor: Colleen M. Fitzpatrick, 18198 Aztec Ct., Fountain Valley, Calif. 92708

[21] Appl. No.: 393,444

[22] Filed: Feb. 23, 1995

[51] Int. Cl.$^6$ ............................................. G01B 9/02
[52] U.S. Cl. ............................................. 356/347; 356/348
[58] Field of Search ............................................. 356/347, 348; 359/4, 3

[56] References Cited

U.S. PATENT DOCUMENTS

| | | | |
|---|---|---|---|
| 3,690,159 | 9/1972 | Kersch et al. | 356/347 |
| 3,826,555 | 7/1974 | Matsumoto | 359/1 |
| 5,132,811 | 7/1992 | Iwaki et al. | 359/6 |
| 5,374,492 | 12/1994 | Hampp et al. | 359/3 |

Primary Examiner—Frank Gonzalez
Assistant Examiner—Amanda Merlino
Attorney, Agent, or Firm—Gene Scott; Patent Law & Venture Group

[57] ABSTRACT

A camera apparatus and method of use employing a photosensitive photopolymer film as a recording medium for generating an interferogram through the use of a write laser beam and a read laser beam. The interferogram is sensed by a video camera and converted into a digital signal for mass storage or real time display on a video monitor. Because the thin film used is of high resolution and is able to handle a sequence of intefferograms at various video signal processing rates, the camera is able to be employed in real time as a motion picture camera for observing real processes and objects undergoing stress.

20 Claims, 10 Drawing Sheets

CAMERA AND METHOD FOR HOLOGRAPHIC INTERFEROMETRY USING AN ERASABLE PHOTOSENSITIVE PHOTOPOLYMER FILM

BACKGROUND OF THE INVENTION

1. Field of the Invention

The present invention relates generally to a camera and method of use for holography and holographic interferometry, and more particularly relates to an apparatus and method for the recording of a continuous sequence of high resolution holograms using a photosensitive photopolymer material such as bacteriorhodopsin (bR) to achieve a high speed, high resolution series of holographic recordings.

2. Description of Prior Art

Holographic nondestructive testing (HNDT) is a well known technique. According to this method, an interferometric fringe pattern is produced by one of three methods: by superimposing two recorded holograms (double exposure interferometry), by allowing a previously recorded hologram to be visually superimposed onto a real time image of an object (real time interferometry), or by recording a single hologram during the vibration of an object (time average interferometry). According to the first two of these methods, a reference hologram is recorded. The object is then stressed by thermal, pressure, or by other means and the reference hologram is interfered with a second hologram or with a real time image of the object in the stressed state. The overlap of the reference hologram with the subsequent hologram or real time image produces an interferogram composed of a fringe pattern. The fringe pattern contains information on the structural integrity of the object. In the third method, where a hologram in recorded of a vibrating object, the hologram records light and dark areas depicting the nodes and antinodes, respectively, of the vibrating object. These bright and dark areas give information on the structure of the object as well.

Several prior art devices are in use. The main disadvantage of these devices is their inability to record holograms in a continuous sequence, at high resolution, and without the necessity of a development cycle. Mother important disadvantage is that the materials which form the basis of the most common HNDT instruments are of fixed geometry, and cannot be adapted to customized applications. A list of these materials is given in Table 1 below.

TABLE I

Comparison of the Most Common Recording Materials Used in HNDT

| Material | Duty Cycle | Sensitivity | Resolution | Diffraction Efficiency | Notes |
|---|---|---|---|---|---|
| Silver Halide | N/A | 50 | 5000 | <2 | Requires wet processing, non-erasable, $5/plate |
| Thermoplastic | 30 s | 10 | 800 | 0–10 | Electronic processing, high voltage required, noisy images |
| Charge Coupled Device (CCD) Arrays | μsec-msec | $10^{-3}$ | 80 | N/A | Interferograms possible only through comparison of single frames. Double exposed images not possible. |
| Photorefractive Crystals | msecs-secs | $10^6$ | Very high | <40 | Limited by crystal geometry. Very expensive. Self-developing, $10K/crystal. |
| Bacteriorhodopsin | μsec-hrs | 250 @ optical density = 2 | 5000 | <7 | Thermal, chemical lifetime control. Self developing. Flexible geometry, $200–$1000/plate |

Silver halide plates have been long outdated for most applications of HNDT. Though silver halide materials have a high resolution of 5000 lines/mm, they are one-shot in nature, so that they cannot be erased and reused to record subsequent holographic exposures. A silver halide plate requires off-line wet-processing, so that after exposure, it must be removed from the holography system, developed, and then later reinserted into the same or similar holography set-up for reconstruction. When a silver halide plate is used to perform real time interferometry (the second method detailed above), the plate must be reinserted in the original system to within a fraction of the wavelength of light from its original position. In addition, if a plate does not dry uniformly after development, the result is a noisy image. Also, silver halide plates are not panchromatic, so their use is restricted to a range of laser wavelengths.

By far, the most popular material for recording holograms for performing HNDT is the thermoplastic material, most commonly used in the HC300 Thermoplastic Camera developed by Newport Corporation, Irvine, Calif. The development of this camera made it possible to perform HNDT without the inconvenience of removing and wet-processing silver halide plates from the optical system. The camera functions on the basis of a 35 mm thermoplastic slide, with which it is possible to record, develop, and then erase a hologram electronically, without removal of the slide. Thermoplastic material can be used to perform HNDT by the second and third methods mentioned above (real time and time average interferometry). However, it is very difficult to superimpose two holograms on the material, so that the first method of double exposure interferometry is rarely used in this context.

The major disadvantage of the thermoplastic camera when used for HNDT is that it requires a 30 second development cycle which strictly limits its use in applications requiring a rapid sequence of interferograms. In addition, its resolution is only 800 lines/mm. The diffraction efficiency of a plate decays exponentially over the guaranteed lifetime of 300 shots, so that the image quality and fringe contrast gradually fade. In industrial environments the plates are particularly prone to attract dust through the use of both corona electrons in the development cycle and forced air to cool the plates after erasure. Also, the use of high voltage in the development and erase cycles often causes breakdown of the thermoplastic material. These factors result in intefferograms with relatively poor signal to noise ratio.

One method that avoids the time delay associated with a material development cycle is known as Electronic Speckle Pattern Interferometry (ESPI), or TV Holography. An example of the latter technique is described in U.S. Pat. No. 3,816,649. In ESPI, a charge coupled device (CCD) camera is used to capture a succession of single holograms, at the standard video rate of 30 frames/sec. Interferograms are formed by software manipulation of pairs of holograms. While ESPI makes it possible to view a fringe pattern directly with a video camera, it has important disadvantages.

Because ESPI is CCD-based, the resolution of the technique is limited by the size of CCD pixels, which are large when compared to the fundamental recording elements of the other materials such as the grains of developable silver found in silver halide materials. This causes the resolution of a single ESPI hologram to be only 80 lines/mm, which is very coarse in comparison with silver halide. When this single low resolution hologram in overlapped in software with another low resolution hologram, the result is an extremely low resolution interferogram. The result is that many of the finer details of the resulting fringe pattern are lost, limiting the use of ESPI in HNDT.

Photorefractive crystals have demonstrated great potential in optical computing and beam steering architectures. However, they have some notable shortcomings which must be taken into account in any applications requiring real time processing and analysis. Photorefractive crystals form diffraction gratings by the migration of spatial charge on exposure to light. While this means very high resolution, it can be an extremely slow process. In one study of iron-doped lithium niobate, maximum diffraction efficiencies of 39% were achieved only after 10 minutes, at a flux of about 25 $mW/cm^2$. In cases where the photorefractive material is faster, it may require a very large amount of light to generate the required densities. For example, at 1 $W/cm^2$, barium titanate has a response time of tens of msecs. These time and sensitivity scales are obviously far outside the boundaries of real time HNDT abilities. In addition, photorefractive crystals are very expensive and not very versatile, due to their crystalline geometry. A 1 $cm^3$ of lithium niobate can cost up to $10,000, for example. For these reasons, photorefractive crystals have never been incorporated into a practical instrument for use in HNDT.

Thus, there is a need for an apparatus that overcomes the disadvantages of prior art devices using silver halide, thermoplastic, and other such instruments for HNDT. The present invention overcomes the disadvantages of the prior art described above and provides other related advantages detailed in the following summary of the invention.

SUMMARY OF THE INVENTION

This patent application presents methods and apparatus for using a photosensitive photopolymer material such as bacteriorhodopsin as a high speed, high resolution holographic recording medium which has applications in double-exposure interferometry, (which is useful in nondestructive testing and aero-optic holography), time average interferometry and real time interferometry.

The present invention is an apparatus and method especially useful in detecting minute time-dependent changes in gaseous and liquid fluid dynamics as well as physical changes in solid objects, such as in the observation of stress and strain dynamics. For example, disturbances in fluids may be observed with the present invention by producing a fringe pattern dependent upon the temporal change in the distribution of the index of refraction of the fluid over the field of view. Measuring such fringe patterns can provide information on the temperature, pressure, and concentration gradients present in the fluid. The invention may also be used to identify the time-dependent characteristics of transparent media, in the form of phase objects, which are present in patterns of fluid flow. This is particularly useful in examining the dynamics of many phenomena such as crystal growth, flame dynamics, and supersonic boundary layer dynamics. Likewise, the present invention can reveal defects in solid objects by using the fringe patterns to identifying contour anomalies of the object.

Applications to discovery of improvements in fluid processing and elimination of defects in manufactured parts are obvious.

Still further, the present invention allows for the observation of nodal patterns of a vibrating object. In addition, if the frequency of the force driving the vibrations is changed in time, the present invention can interferometrically image the vibration patterns of the object as they change.

It is therefore an object of the present invention to provide a method and apparatus for nondestructive testing of objects as well as other interferometric applications. It is another object to provide a testing method and apparatus which incorporate a material that provides high resolution, but does not require a development cycle on exposure to light. It is another object to provide a testing method and apparatus wherein the image detector can be a video camera, or equivalent device. It is another object to provide a testing method and apparatus capable of providing an analog output signal compatible with interfacing with a video recording device or with a high speed digital computer for rapid analysis. It is another object of the invention to reduce the time and expense required in the inspection of objects by reducing the use of disposable material. It is another object to provide a method of nondestructive testing wherein interference patterns are detected in "real time" by an image sensing device. It is another object to provide a method and apparatus for nondestructive testing and other interferometry applications, wherein objects or transparent media can be analyzed at the rate of 1 frame/hour of higher, including conventional video frame rates. It is another object to provide a testing method which is sufficiently rapid to be used in a typical production process. It is another object to provide a testing method and apparatus which is capable of imaging real time changes in the nodal pattern of a vibrating object. It is another object to provide an apparatus to image disturbances in fluids.

Other objects and advantages of the invention will be apparent to those skilled in the art, from a reading of the following brief descriptions, the detailed description of the invention, and the appended claims.

BRIEF DESCRIPTION OF THE DRAWINGS

The accompanying drawings illustrate the invention. In such drawings.

DETAILED DESCRIPTION OF THE INVENTION

Figure 1:
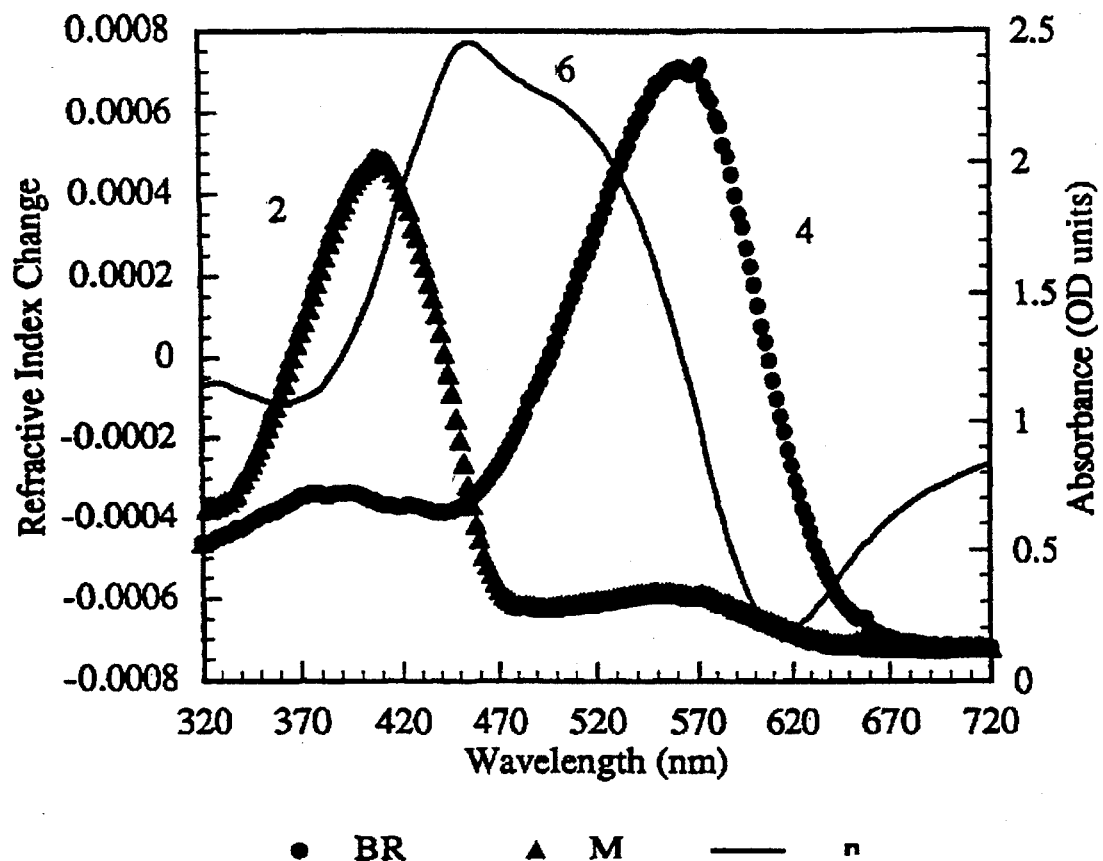
FIG. 1 is a graph showing the absorption spectra of bR and its M intermediate and showing the refractive index change associated with a solution of pure M going to a solution of pure bR, assuming a solute concentration of $2 \times 10^{-3}$ molar solution of light molar in 65% glycerol: water (vol:vol) at 40° C.

Until now conventional holographic aero-optic instrumentation has been extremely limited by the one-shot nature of silver halide materials. This has limited data taking to a single double exposure, which records the change in fluid configuration between two distinct points in time. Unfortunately, this method cannot give information on the real time development of flow systems.

To alleviate this difficulty, bacteriorhodopsin has been studied as a means of creating interferometric "movies." Bacteriorhodopsin is an organic photochromic material that is sensitive to single photon stimulation with picosecond response times, making it an excellent new, high speed, erasable, dynamic optical recording material that is ideal for creating successive multiple holographic exposures in flow visualization. With its high speed recording capabilities, its high resolution, and its erasability, bacteriorhodopsin has the potential of superseding technology that is already 20 years old. It can be easily integrated into holography systems in place of silver halide materials, with very little change in the experimental set-up. Bacteriorhodopsin has already proven useful in such contexts as Fourier transform holography, pattern recognition architectures, and three-dimensional optical memories.

The present invention provides a means of recording a rapid sequence of high resolution interferograms on a self-developing thin film, preferably a film constructed of the organic material bacteriorhodopsin (bR). The present invention, not requiring a film development step, provides the significant advantage of being applicable to real time process analysis and evaluation. Also, bR film is self-erasing, recovering from each exposure at a rate sufficient, in many cases, to eliminate the necessity of an erase step. This is possible by allowing each recorded image to decay via the natural thermal process of the material.

The bacteriorhodopsin thin film acts as a high resolution image buffer for the recording of each constituent hologram during the interferometric recording procedure, such as that used in HNDT. The macroscopic fringe patterns that result from exposing the bacteriorhodopsin film according to any of the three interferometric recording methods described above are then transferred by optical means to a camera, preferably using charge coupled device (CCD) technology, or other electronic image sensor. The images are then processed into observable video display images by high-speed digital microprocessor technique. The bR material is either allowed to erase itself by its own natural thermal decay process, or, if necessary, each image can be erased with a flash of light, preparing the bR to record the next hologram.

Thus, the invention is capable of inspecting flows or changes in the conformation of objects at the rapid rates demanded by many production processes.

Because the response of bR to light is to initiate a reversible chemical reaction, the number of recording cycles the thin film can endure without showing signs of fatigue is virtually limitless. Therefore, the active element in the present invention, namely, the bR thin film, is a permanent component of the camera, and can be incorporated directly into its construction.

The apparatus of the present invention includes a camera with a bR slide as the active recording material positioned in relation to an exposure aperture for accepting incident light. The camera is used in a holographic optical set-up which uses a source of coherent radiation, such as a laser, to record holograms directly on the bR film. The optical set-up may use a single laser or it may use separate lasers of different wavelengths to simultaneously or sequentially record and read the holograms. If a single laser is used, a simultaneous record/read operation is used, and the angle with which the laser beam must impinge on the bR film with respect to the normal of the film is restricted to read/write angles $\theta_{rw}$, such that:

$$\theta_{rw} \leq \sin^{-1}(1/2) \qquad \text{Eq. 1}$$

If two separate lasers of different wavelengths are used, simultaneous or sequential record and read operations can be used. In this case, the relationship between the angles with which the two lasers must impinge on the surface of the bR film with respect to the normal of the film is given by Bragg's law:

$$\frac{\sin\theta_w}{\lambda_w} = \frac{\sin\theta_r}{\lambda_r} \qquad \text{Eq. 2}$$

where $\theta_w$ and $\theta_r$ are the angle of the write and read laser beams with respect to the normal to the film, respectively, and $\lambda_w$ and $\lambda_r$ are their wavelengths, respectively.

The apparatus is made such that the bR thin film, mounted on a suitable substrate, covers an aperture on the front of the camera, the center of which dictates the height of the optical axis of the external holographic optical train. The bR slide is mechanically fastened in a fixed position on the body of the camera to prevent any movement of the slide in relation to the other elements of the camera. Optionally, a spectral filter may be placed behind the bR slide in order to block the write beam from a sensor element, preferably a CCD element, in the interior operating space within the camera. A portion of the incoming light, whether from a single read/ write laser beam, or from only the read beam if separate read/write lasers are used with a spectral filter, impinges on a small silicon or other type detector, thereby checking the angle of the impinging beam. If the detector does not register a signal, an fault signal is generated and the angle of the beam must be corrected. Mechanical means is used to position the detector so as to detect the incoming light beam at any selected angle over a desired range. The angle of interest is measured with respect to the normal of the bR slide. To record the diffracted pattern of the read beam, and hence to register the interferogram, the CCD camera or other sensor element is positioned at the same angle as the fault detector, but on the opposite side of the normal to the bR slide. Both of the sensors are symmetrically adjustable in their angular positions relative to the normal.

CHARACTERISTICS OF BACTERIORHODOPSIN

Bacteriorhodopsin (bR) is the light harvesting protein in the purple membrane of Halobacterium halobium. The purple membrane is grown by the bacteria when the concentration of oxygen becomes too low to sustain the synthesis of ATP. The great advantage that biological materials have over conventional materials is that over millions of years, through trial and error, nature has optimized the physical characteristics of such materials, in terms of photon gathering, light transducing efficiency, photochemical stability, and thermal stability. These characteristics have evolved for the most part because of the biological necessities of being as energy efficient as possible, with the ability of surviving under environmental extremes of temperature and chemistry. For this reason, bR is an excellent candidate for high speed holographic applications, which require durable materials capable of very fast cycle times.

On exposure to light, bR undergoes a photocycle, passing through a number of intermediates. The two most important photochemical intermediates in the bacteriorhodopsin photocycle are referred to as bR and M. The initial state, bR, is characterized by a large absorption maximum in the yellow region of the visible spectrum ($\lambda max \approx 568$ nm). Upon the absorption of light energy by the latter, bR passes through a series of photochemical intermediates to the blue light absorbing M state ($\lambda max \approx 413$ nm). Because M has a strongly blue shifted absorption maximum relative to bR, this intermediate plays an important role in most optical applications where a large shift in absorption maxima and a corresponding change in refractive index is required for optimal function. Under standard biological conditions, M thermally reverts to the ground state with a time constant of approximately 10 msec. By suspending bacteriorhodopsin in a polymer matrix and adding certain chemical agents to the solution, the M lifetime can be dramatically increased to 15–30 minutes. This property, coupled with the high quantum yield of formation in the forward and reverse direction (f=0.64), high photocyclicity (>106 write/read/erase cycles) and excellent thermal stability (>90%°C.) give bacteriorhodopsin photochromic qualifies unavailable in most other organic photochromics (R. B. Gross, K. C. Izgi, and R. R. Birge, "Holographic Thin Films, Spatial Light Modulators, and Optical Associative Memories Based on Bacteriorhodopsin," SPIE Proceedings Images Storage and Retrieval Systems, 1662, (1992), p. 1).

At room temperature, bR is coupled to its M intermediate according to the following reaction:

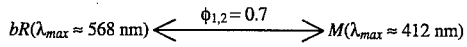

where $\phi_{1,2}$ represents the quantum efficiency in the forward and the reverse direction. The wavelengths indicated are the peaks in the absorption spectra of the various species. A comparison of the absorption spectrum 2 of bR and the spectrum 4 of its M intermediate is shown in FIG. 1. The dispersion in the refractive index is shown as the thin solid line 6 in the figure. It can be seen from the figure that the photochemical reaction depicted above is associated with a large shift in absorption spectrum, and/or a change in index of refraction. Furthermore, the formation of M occurs within microseconds. This characteristic implies an accurate and reproducible assignment of state, and thus the potential of high speed optical recording (R. R. Birge, K. C. Izgi, J. A. Smart, and J. R. Tallent, "Wavelength Dependence of the Photorefractive and Photodiffractive Properties of Holographic Thin Films Based on Bacteriorhodopsin," Proceedings of the Materials Research Society, in press).

Figure 2:
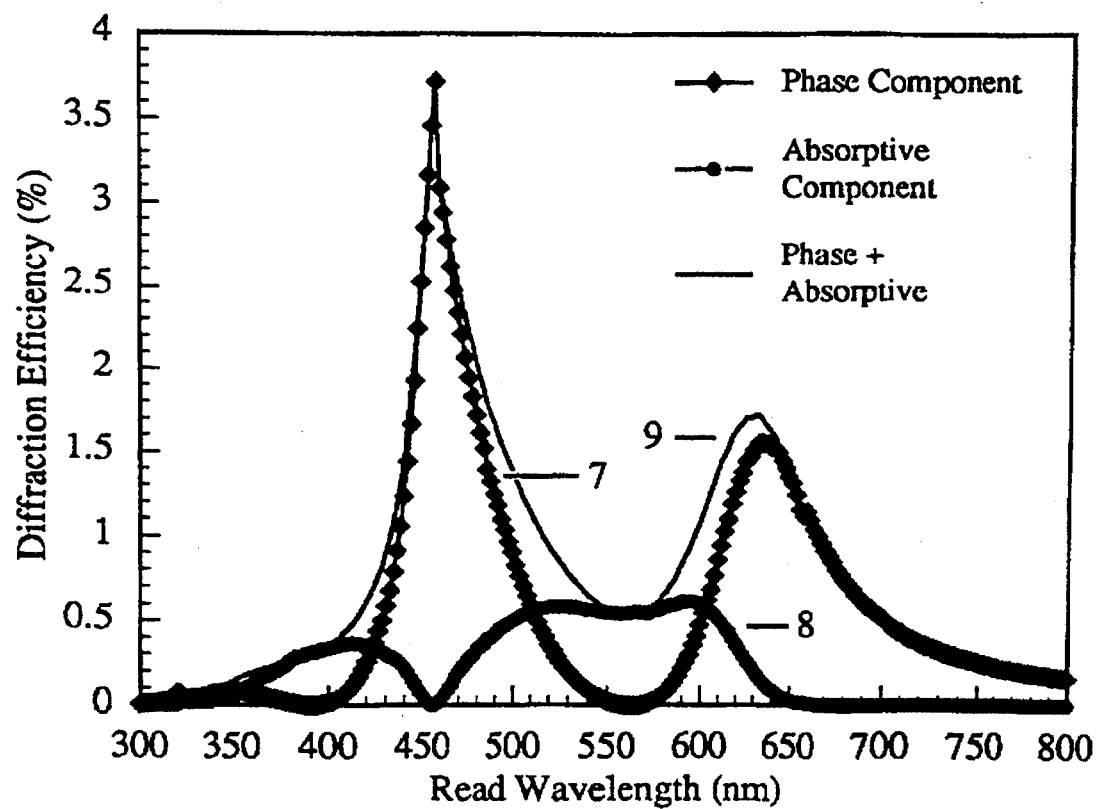
FIG. 2 is a graph showing the diffraction calculated efficiency of holograms recorded in bR as a function of wavelength.

The diffraction efficiency of the bR to M transformation is shown in FIG. 2. The figure shows both phase ($\eta_{phase}$) 7 and amplitude ($\eta_{abs}$) 8 contributions to the total diffraction efficiency ($\eta_{total}$) 9. By comparing this figure with those above, it can be seen that at about $\lambda \approx 570$ nm, where there is very little change in refractive index, the diffraction efficiency curve is dominated by a large contribution from absorption. On the other hand, at $\lambda \approx 470$ nm, where bR and M have the same absorption coefficient, and therefore have equal probability of absorbing a photon, the diffraction efficiency is dominated by phase contributions. The important thing here is to note that bR is a panchromatic material, and will respond to all visible wavelengths.

Note, however, that the main difference between bR and other holographic recording materials is the physical basis of its response to light. In other materials, a diffraction grating is written into the material by some permanent or semi-permanent change in a physical characteristic, such as by the formation of a surface relief pattern or an exposed silver grain. But in bR, the exposure is accomplished by driving a reversible chemical reaction. If bR is exposed to an appropriate wavelength of light, the reaction will be driven in one direction. If the original light source is removed, or exchanged for one more appropriate to M absorption, the reaction will be driven in the reverse direction.

Theoretically speaking, this implies that the material has virtually no lower threshold on sensitivity, and that even one photon could create some diffraction efficiency. Simply stated, the more light, the higher the diffraction efficiency, up to a certain theoretical limit. FIG. 2 is meant to illustrate the maximum calculated diffraction efficiencies. Experimental results are quickly approaching this limit.

Thin films of bacteriorhodopsin may be obtained from Bend Research Corp. in Bend, Oreg. Typical film characteristics are given below:

| | |
|---|---|
| Optical Density | 2 O.D. |
| M State Lifetime | >30 msec |
| Resolution | >5000 lines/mm |
| Diameter | 1" |

HOLOGRAPHIC RECORDING TECHNIQUES

Figure 3:
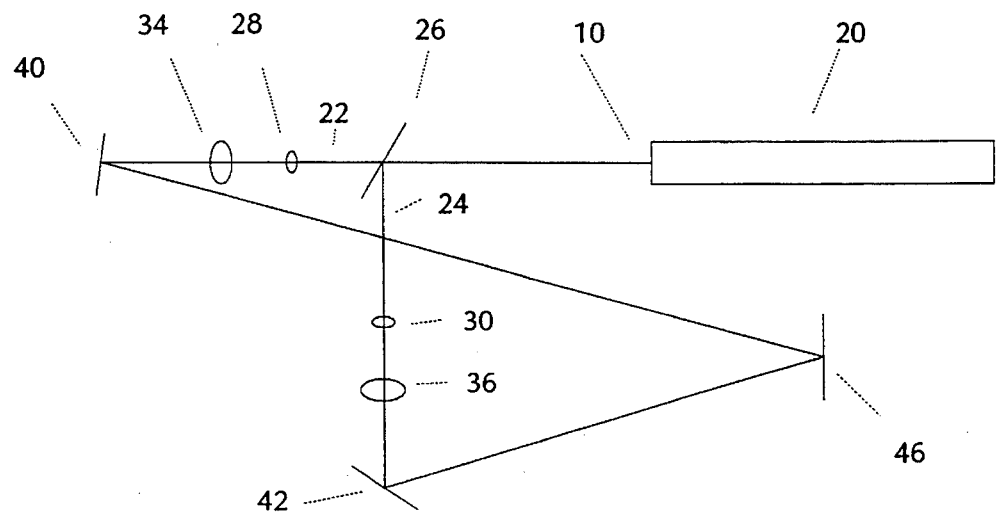
FIG. 3 is a diagram showing an experimental set-up for producing a diffraction grating.

To illustrate the experimental approach, consider the diagram of a simple holographic set-up, used to record a diffraction grating (FIG. 3). Light 10 exits from the write laser 20, and it is divided into two equal beams 22, 24 by a beam splitter 26. The two beams 22, 24 are individually expanded by lenses 28, 30 and collimated by subsequent lenses, 34, 36. The beams are then reflected by mirrors 40, 42 onto the recording material 46. If the two beams 22, 24 recombine at the recording material at angles $\theta_1$ and $\theta_2$ with respect to the normal to the film plane, they generate fringes whose spacing is given by:

$$d = \frac{\lambda}{\sin\theta_1 + \sin\theta_2} \quad \text{Eq. 3}$$

Changing the angle of one of the mirrors 40, 42 by δθ will result in a different grating spacing. If the two gratings are overlapped, an interferogram will result, whose macroscopic, straight line fringe spacing will be given by (Nils Abramson, The Making and Evaluation of Holograms, Academic Press, 1981, p. 130):

$$s = \frac{\lambda}{2\sin[\delta\theta/2]} \quad \text{Eq. 4}$$

This is the technique used in aero-optic holography, where one of the beams that creates the diffraction gratings (either 22 or 24) passes through the fluid to be examined. By "dithering" one of the mirrors 40, 42 at angle δθ between holographic exposures, flow characteristics can be observed as a perturbation on top of a straight-fringe interferogram like the one described.

In the case of HNDT, one of the mirrors (40, 42) is replaced by a solid object which reflects light onto the bR thin film. The object is stressed by thermal, pressure, or vibrational means during holographic recording performed by one of the three methods described above. The natural displacement of the contours of the object under these stressing methods takes the place of the "dithering" of the mirror necessary in the aero-optic methodology described above.

Because bR is serf erasing material, the basic geometry depicted in FIG. 3 must be modified so that the interferometric pattern generated by the write laser (20) is simultaneously read and recorded. This is done is one of two ways, as shown in FIGS. 4 and 5.

HOMODYNE RECORDING AND READOUT

Figure 4:
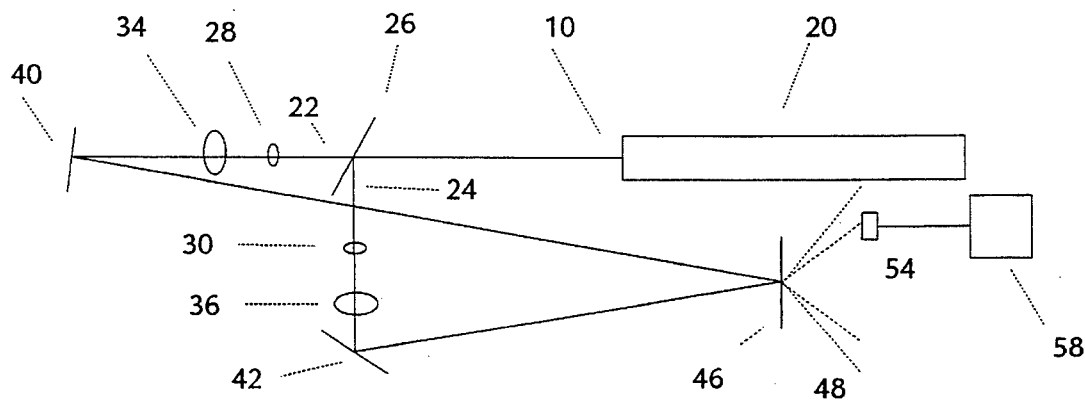
FIG. 4 is a diagram showing the homodyne experimental set-up for the preferred embodiment.
Figure 5:
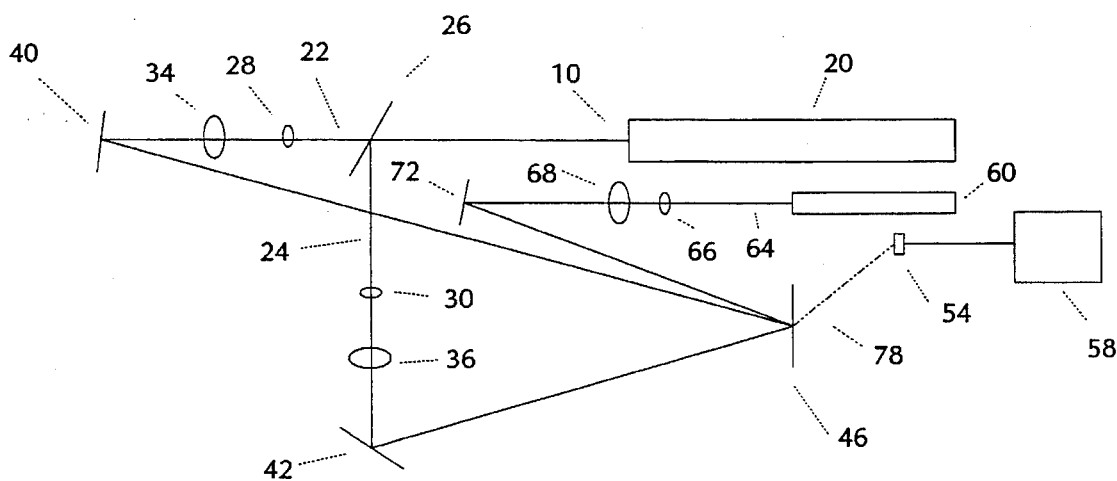
FIG. 5 is a diagram showing the heterodyne experimental set up for the preferred embodiment.

In homodyne readout, as shown in FIG. 4, the optical set-up is similar to that shown in FIG. 3, except that the write laser is restricted to smaller angles $\theta_w$ such that the grating formed on the recording material 46 will diffract the light of the write laser 20 into higher order diffracted images 48. These higher order images will appear at angles $\theta_r$ given by:

$$\sin\theta_r = n\sin\theta_w \quad \text{Eq. 5}$$

where n≈1,2,3 . . . is an integer. Note that Eq. 1 above indicates the limiting behaviour of Eq. 5, where n=2, and $\theta_r$ = 90°, and serves to give an upper bound on the angle $\theta_w$ at which homodyne recording can take place. An image detector 54 detects at least one of these higher order images 48 and generates an electrical signal compatible with interfacing to a permanent electrical storage device 58.

HETERODYNE RECORDING AND READOUT

In heterodyne readout, as shown in FIG. 5, the write laser 20 is supplemented by a separate read laser 60, positioned relative to the write laser 20 according to Bragg's Law given by Eq. 2. Light 64 from the read laser 60 is expanded by lens 66 and collimated by a second lens 68. The collimated read light is reflected by mirror 72 onto the recording material 46. The grating formed on the recording material 46 generates a diffracted read beam 78 behind the material at an angle given by Bragg's Law with respect to the normal to the plane of the material. An image detector 54 detects the diffracted read beam 78 and generates an electrical signal compatible with interfacing to a permanent electrical storage device 58.

RELATIVE TIMING OF MULTIPLE EXPOSES FOR INTERFEROGRAM FORMATION

Figure 6:
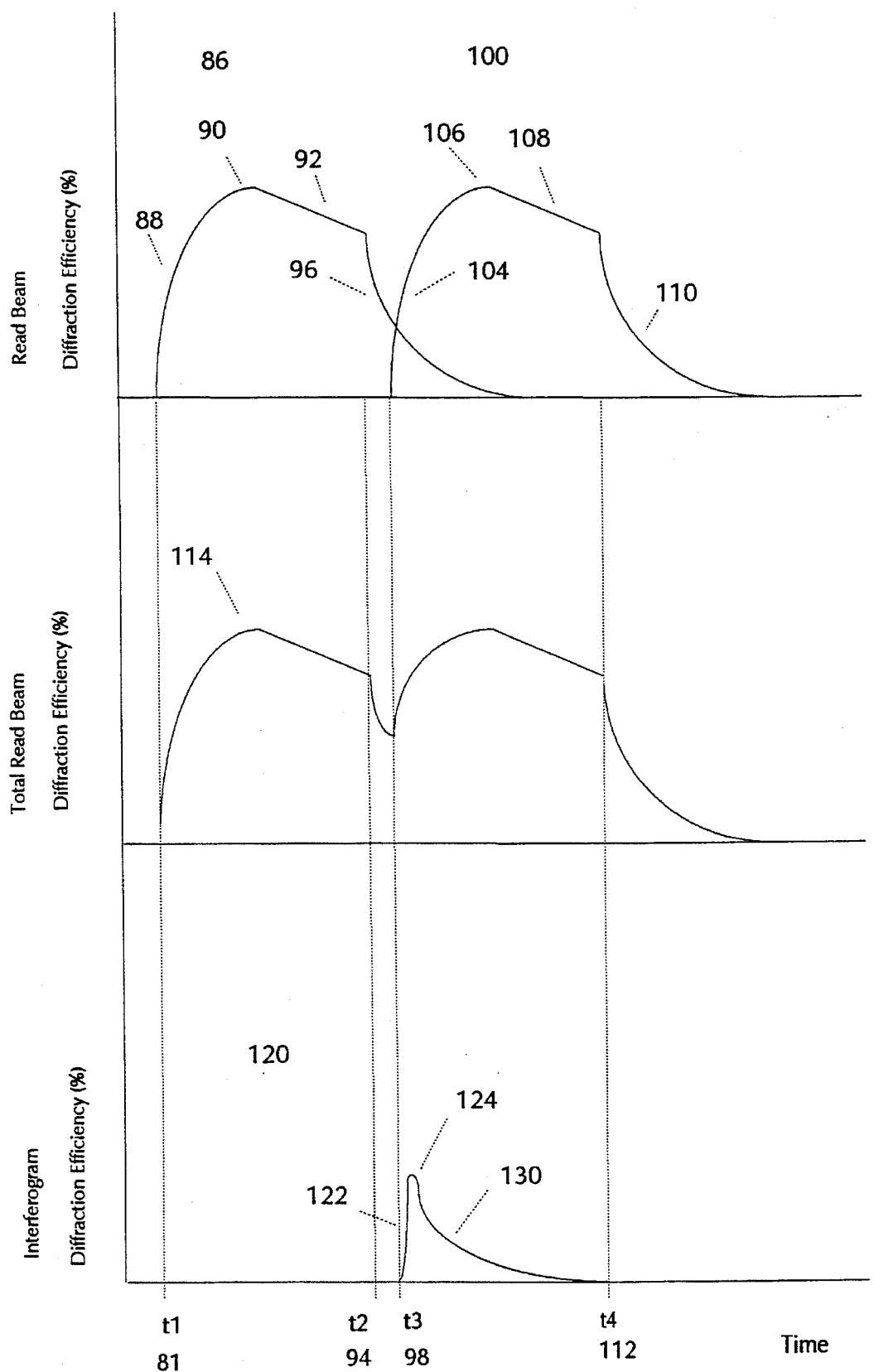
FIG. 6 is a chart showing a timing diagram depicting the overlap of two holographic exposures on a bacteriorhodopsin thin film.

Because of the finite lifetime of a holographic grating recorded on bR thin films, the timing of the two exposures creating an interferogram is very important, since the two gratings thus generated must exist on the thin film simultaneously with the most efficient overlap possible. FIG. 6 illustrates the behaviour of the intensity of the diffracted portion of the read beam as a function of the relative timing of the exposures used in double exposure interferometry. On the first exposure of the material to the write beams at $t_1$, 81, a holographic grating is formed in the material over the duration of the exposure. As this grating becomes more well formed, the amount of light diffracted from the read beam by the grating shows a characteristic pattern known as a growth curve 86. The growth curve shows a sharp increase 88 at first, as a function of the total amount of light present in the read beam. At some point, the diffraction efficiency of the read beam reaches its maximum 90, levels off, and may even decrease somewhat 92. When the first exposure is completed at $t_2$, 94, and the write beams are removed, the diffraction efficiency from this exposure will experience an exponential decay 96. When the second exposure is begun at $t_3$, 98, a second grating is formed on top of the remaining portion of the first grating. The behaviour of the intensity of the diffracted read beam to this second grating will generate a second growth curve 100 similar to the first growth curve 86, having a sharp initial increase, 104, a maximum 106, a slight decrease 108, followed by an exponential decay 110 once the second exposure has been completed at $t_4$, 112, and the write beam has been removed. The diffracted read beam intensity represented by the two growth curves is additive, so that the total diffracted read beam intensity 114 is the sum of that from the two individual diffracted read beams. However, the interferogram exists only when both diffracted read beams are present simultaneously, and is brightest when the two diffracted read beams are of approximately the same value. Therefore, the diffracted intensity 120 of the interferogram starts out very low only at the beginning of the second exposure, increases to a maximum 124 as the two diffracted intensities become equal, and then experiences a fading away 130 as the first growth curve 86 dies out and the second growth curve 100 increases. For this reason, the timing of the double exposure is very important. As the first growth curve 86 formed by the first exposure dies away, the second growth curve 100 must be increasing in such a way that the two intersect at as high an intensity on their respective curves as possible.

Figure 7:
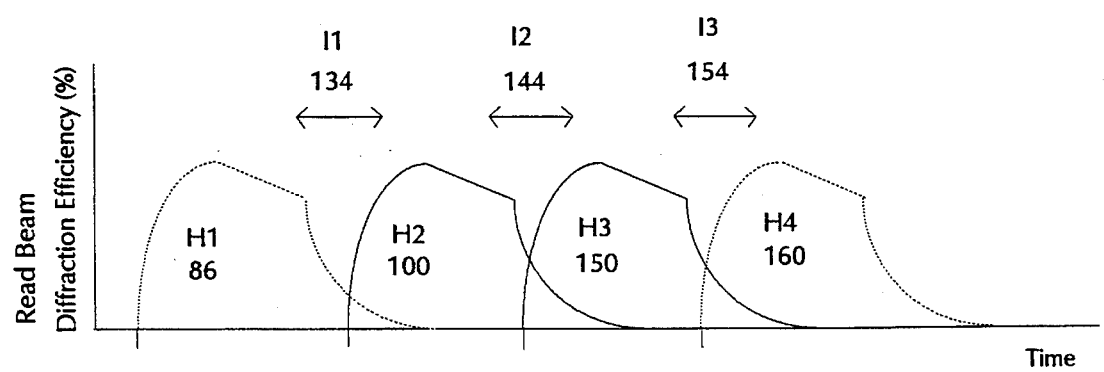
FIG. 7 is a chart showing a timing diagram depicting the recording of a train of holographic and interferometric exposures on a bacteriorhodopsin thin film.

These interferometric double exposures can be made in a way that each pair of exposures is isolated all other pairs of double exposures, or they can be made in a running sequence, where adjacent pairs of exposures are linked to generate intefferograms in a continuous fashion, as shown in FIG. 7. In the ease of a "running" image, the behaviour of the intensity of the first interferogram 134 is composed of the growth curves 86 and 100 generated by the first two exposures. As the first exposure 86 fades, a second interferogram 144 is formed by the second exposure 100 and a third exposure 150. As the second exposure 100 fades, a third interferogram 154 is formed by the third exposure 150 and the fourth exposure 160, and so on. The repetition rate of the exposures can be timed in relation to the lifetime of the bacteriorhodopsin recording material.

IMAGING CAMERA APPARATUS

Figure 8:
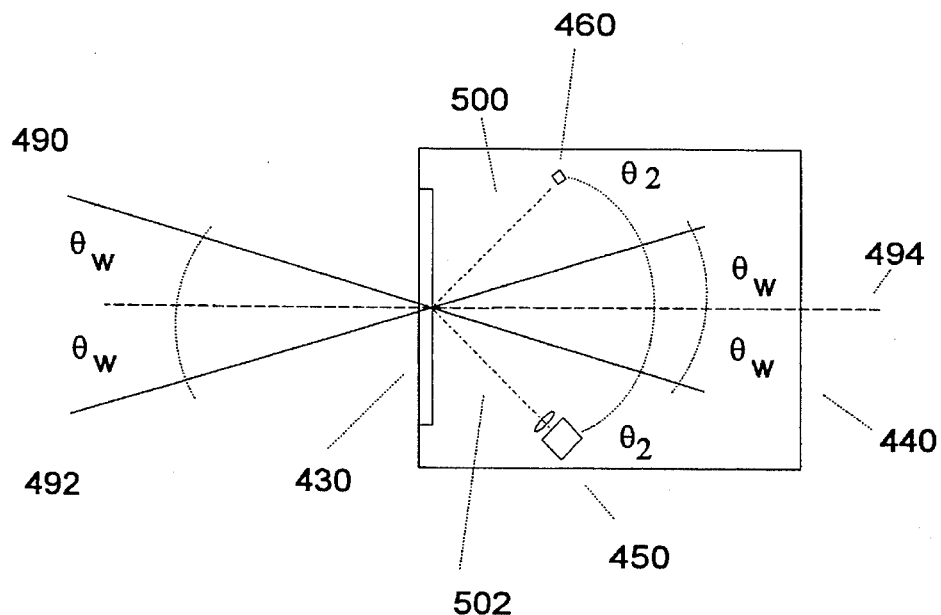
FIG. 8 is a plan view of a schematic representation of the first preferred physical layout of the elements of the present invention.
Figure 9:
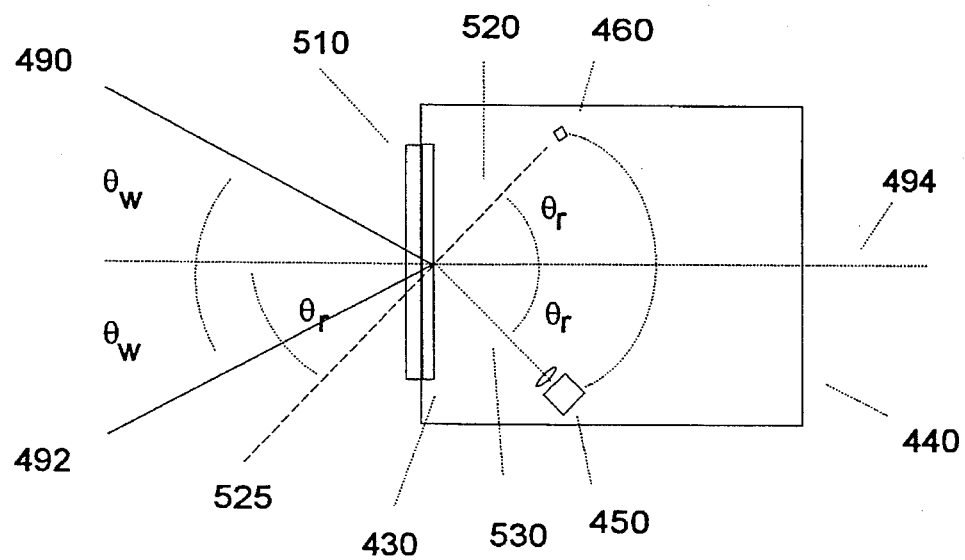
FIG. 9 is a plan view of a schematic representation of the second preferred physical layout of the elements of the present invention.

A schematic of the imaging camera apparatus disclosed herein is shown in FIG. 8 for homodyne operation, and in FIG. 9 for heterodyne operation. It is similar in construction to the Newport Corporation HC300 thermoplastic camera, so that external optical systems already incorporating the thermoplastic camera could be retrofitted with the bR imager. However, the design of the present camera apparatus has several improvements over the prior art camera. For one thing, the optical axis of the present camera is much lower than the old camera's axis of 7 inches above the optical table. This eliminates the requirement of mounting any external optics high off the optical palette, thereby decreasing the susceptibility of the whole system to disturbances from external vibrations. The bacteriorhodopsin thin film which is the active recording material used in the apparatus shows virtually no degradation over many exposure cycles, so that the bacteriorhodopsin slide can be permanently mounted in fixed relation to the camera body. This is in contrast to the design of the thermoplastic imager, using thermoplastic slides which degrade drastically over a lifetime of 300 cycles, and which therefore have to be frequently replaced. Because of this, the bacteriorhodpsin slide is also well supported around its entire perimeter, so that it is less open to mechanical vibrations than the old cantilever design of the thermoplastic slide support. Finally, since the bacteriorhodopsin material is self-developing, so that the present apparatus does not require high voltage to sensitize the material for recording or as pan of an electronic development cycle, thus eliminating much of the electronic high voltage circuitry required by the thermoplastic camera.

Figure 11:
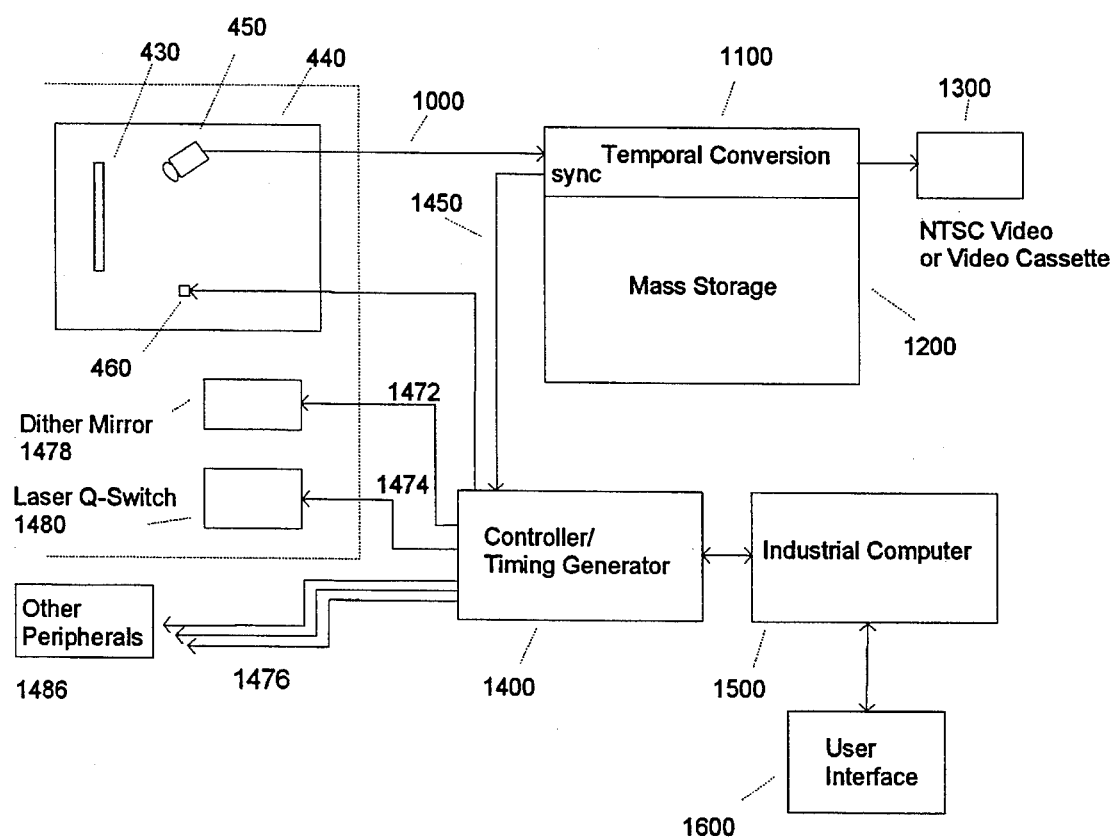
FIG. 11 is a block diagram of the holocamera electrical and computer interface.

In FIG. 8, depicting homodyne operation, the bacteriorhodpsin slide 430 is mounted over an appropriate exposure aperture, the camera body or housing 440 enclosing an operating space. It is backed by a CCD camera 450, which is mounted in the camera housing 440. To increase the commercial viability of this device, the design may be adapted to either a CCD camera operating at standard video frame rates or to a high speed CCD camera. Behind the film plane, a small silicon photodetector 460 functions as a fault detector, and is used to monitor the angle $\theta_w$ of the incoming write beams 490, 492 to check their angular positions relative to the normal 494 to the bR slide 430. The positions of the silicon photodetector 460 and the CCD camera 450 are changeable by the user according to range of angles of the write beams 490, 492 the user may require, and there is a scale external to the camera housing 440 indicating the position of the silicon photodetector 460 and the CCD camera 450 within the housing 440. In the ideal case, there is an external digital display whereby the angular position $\theta_2$ of the higher order diffracted write beams 500, 502, as calculated by Eq. 5 are read out. The imager is computer-controlled and the CCD camera 450 is synchronized to the data storage system, external optics such as the dither mirror or an external mechanism used to stress the sample, and the laser exposure. A schematic of the electrical and computer interface between the bacteriorhodpsin camera and the rest of the system is shown in FIG. 11.

FIG. 9 depicts heterodyne operation of the present apparatus. In this ease, a removable color filter 510 has been placed over the bR slide 430, to block access of the write beams 490, 492 to the interior of the camera housing 440. At first, during initial set-up of the camera in the overall optical system, the camera is used without the color filter 510 to allow a check the position of the write beams 490, 492 with the silicon photodetector 460 as before. Then, the color filter 510 is placed into position, to prevent access of the write beams 490, 492 to the camera interior. The silicon photodetector 460 is now repositioned to read the position of the transmitted portion 520 of the incident read beam 525, to check that its angular position $\theta_r$ satisfies the Bragg condition given in Eq. 2 relative to the normal 494 of the bR slide 430. The CCD camera 450 is positioned at the same Bragg angle $\theta_r$ on the opposite side of the normal to the bR slide 430 as the transmitted read beam 520, in order to record the diffracted read beam 530. As in the configuration shown in FIG. 8, the positions of the silicon photodetector 460 and the CCD camera 450 are changeable by the user according to range of angles of the write beams 490, 492 and the transmitted read beam 520 required by the user, and there is a scale external to the camera housing 440 indicating the position of the silicon photodetector 460 and the CCD camera 450 within the camera housing 440. As before, the imager is computer-controlled and the CCD camera 450 is synchronized to the dam storage system, external optics such as the dither mirror or an external mechanism used to stress the sample, and the laser exposure. A schematic of the electrical and computer interface between the bacteriorhodpsin camera and the rest of the system is shown in FIG. 11.

OPTICAL INTERFACING/OPTICAL PALETTE DESIGN AND CONSTRUCTION

Figure 10:
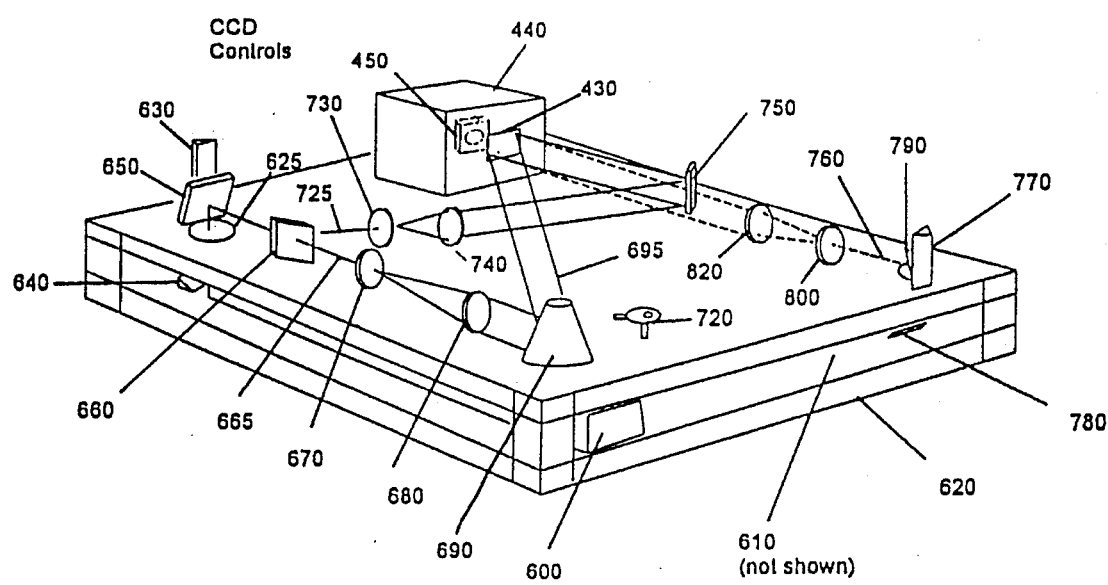
FIG. 10 is a schematic design of the integrated holocamera optical system of the present invention.

A conceptual design of a typical integrated holecamera optical system is shown in FIG. 10. To be of practical use in the applications described, the apparatus depicted in FIGS. 8 and 9 above must be integrated with external hologram-forming optics. FIG. 10 shows a palletized version of such an optical set-up which for applications in holographic nondestructive testing. In the figure, the write laser 600 (a pulsed Nd:YAG, for example) and the read laser 610 (a small HeNe laser, for example), are incorporated below the optical platform 620. The beam 625 from the write laser 600 is brought up to the top of the platform 620 and into the optical train using periscope 630, composed of mirrors 640, 650. Ideally, the write beam periscope 630 can be rotated out of the way, to allow the insertion of an external laser into the optical train, if the need for a higher power or a different recording wavelength arises. The write laser beam 625 exits periscope 630 and impinges on beam splitter 660 where a portion 665 of the write laser beam 625 passes through the beamsplitter 660 and is expanded by lens 670 and collimated by lens 680. It then illuminates test object 690 which scatters light 695 onto the bacteriorhodopsin slide 430 in fixed relation to the camera housing 440. There is a stressing mechanism 720 such as a hot air blower or an apparatus to generate vibrations in the test object 690, in close relation to the test object 690. The remaining portion 725 of the write laser beam 625 is reflected from the beamsplitter 660, is expanded by lens 730, collimated by lens 740, and finally is reflected by mirror 750 onto the bacteriorhodopsin slide 430 in the camera housing 440. The interference of the two portions 665, 725 of the write laser beam 625 create a diffraction grating on the bacteriorhodopsin slide 430.

At the same time, the beam 760 from the read laser 610 is brought up to the top of the platform 620 and into the optical train using periscope 770, composed of mirrors 780 and 790. The read beam, 760 reflects from mirror 790 and is collimated by lenses 800 and 820. It then falls on the bacteriorhodopsin slide 430 in the camera housing 440 at the Bragg angle as described above. A portion of the read beam is diffracted by the grating that is written by the write beams 665, 725 into the CCD camera 450 internal to the camera housing 440.

The palette described may be semi-portable, and, if necessary, vibration isolated from its environment by small inner robes or vibration isolation legs. All optics should be securely fastened to the palette to prevent motion during the experiment., although in the ideal case, the positions of the write beams 665, 725 and the read beam 760 could be adjusted prior to the experiment to accommodate a range of object sizes and orientations.

ELECTRICAL/COMPUTER INTERFACING

A block diagram of a typical holocamera electrical and computer interface is shown in FIG. 11. The CCD camera 450 within the camera housing 440 provides a synch pulse 1000 to the Temporal Conversion block 1100. This Temporal Conversion block 1100 and the Mass Storage block 1200 represent data buffering and storage for the incoming video frames. The block can be similar to the Kodak Model 1012 Motion Analyzer System, which is capable of high speed data buffering and storage. The Temporal Conversion block 1100 is also interfaced to a means of storing hard copies of incoming data, such as an NTSC Video or VHS Cassette Recorder, 1300.

The Controller/Timing Generator 1400 is a custom-designed electronics package, drawing a synchronization pulse 1450 from the Temporal Conversion Unit 1100, and converting it to timing pulses 1472, 1474, 1476 appropriate to other components of the system such as an external dither mirror 1478, laser Q-switch 1480, and any system peripherals 1486. The Controller/Timing Generator 1400 also interfaces to the silicon photodetector 460 inside the camera housing 440 to process any fault detection pulses provided by the photodetector to halt system function if necessary.

The entire system is ultimately controlled by the Industrial Computer 1500. In one embodiment, the Industrial Computer 1500 is a PC-compatible industrial computer. This type of computer is preferred due to the widespread availability of hardware and software for PC architectures. The system will operate under a User Interface 1600 similar those compatible with a DOS operating system. The Industrial Computer 1500 communicates with the Controller/Timing Generator 1400 as well as the Temporal Conversion block 1100 to keep constant information on the health and function of the data taking procedures. It also relays commands from the operator to these instruments, to allow user control of data taking procedures. For example, the Industrial Computer 1500 via the User Interface 1600 can be used to adjust the frequency of the dither mirror, to initiate the part stressing mechanism in relation to the timing of the laser exposures, or to halt system function if the write or read beams is out of alignment and a fault is detected.

SYSTEM TIMING REQUIREMENTS

Figure 12:
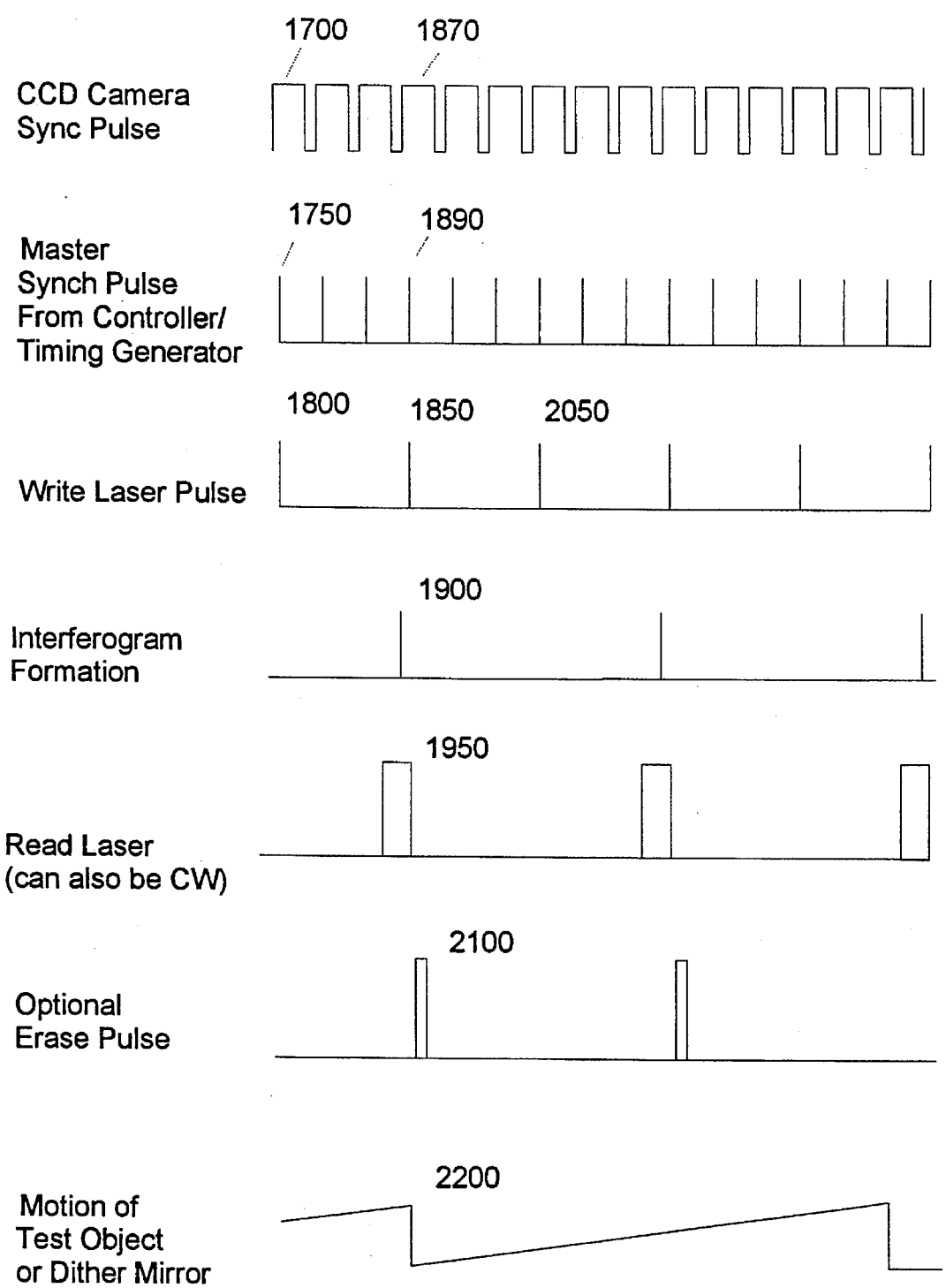
FIG. 12 is a timing diagram depicting the system timing requirements in the current method.

The system timing requirements are described in the timing diagram shown in FIG. 12. The overall function of the timing is compatible with that of FIG. 7, in that all elements in the system must be linked together for the ultimate purpose of capturing the diffracted image of each interferogram. Ideally this is done without capturing either the first write pulse of the interferometric pair, or any subsequent erase pulse which may follow. if a dither mirror is used, it must also be linked into the system, so that the mirror motion is repeatable in step with the laser pulses.

The chronology of the recording process is as follows, according to timing diagram presented in FIG. 12. Each pulse 1700 of the CCD camera is used to create a master sync pulse 1750 used to control the rest of the system via the Temporal Conversion block and the Controller/Timing Generator in FIG. 11. This master sync pulse 1750 generates the first exposure 1800 of the bR film to the write laser by the opening of a shutter or by the generation of a Q-switched laser pulse. This is followed by a second exposure 1850 of the film to the write laser, generated in the same way by subsequent CCD pulse 1870 and subsequent master sync pulse 1890. Interferogram formation 1900 occurs in the bR material simultaneous to the appearance of the second write laser exposure 1850.

During this time, the read laser will be allowed to illuminate the film either continuously or it will be shuttered so that the exposure 1950 of the bR film to the read laser will be simultaneous with the second write exposure 1850. Because the whole system function is originally synchronized to the CCD camera, the read operation 1950 will occur simultaneous to a subsequent CCD pulse 1870. The time interval over which the read operation occurs should be as long as possible in relation to the frame time of the CCD camera in order to accumulate as many photons at the faceplate of the camera as possible. Right after the read operation 1950 is complete, but before the next pulse from the write laser 2050, and optional erase pulse 2100 can occur, to erase the bR film and prepare it for the next write pulse 2050. The optional erase pulse 2100 should be as short as possible. The erase pulse is used if the lifetime of the bR film is long in comparison with the pulsed write laser repetition rate or with the CW write laser shuttering.

During this time, in aero-optic applications, the dither minor in the external optical train is allowed to oscillate in synch with the laser pulses, so that one cycle 2200 of mirror oscillation matches the time requires to generate an interferogram. In the case of HNDT, where there is less control over the test object deformation required to produce an interferogram, the stressing mechanism may be operated continuously, independent of system timing considerations.

SYSTEM PERIPHERALS

Two additional items of interest important in the overall function of the holocamera system are the CW write laser and read laser shutters and the optional erase lamp. There are two ways to handle the shuttering requirements. The first is to use a mechanical shutter for each laser, with appropriate electronic synchronization. However, this method is slow and may introduce unwanted vibrations into the optical system. The second is to use an acousto-optical shutter external to the two lasers to divert the beams when they are not needed to illuminate the sample. The A/O modulator used is similar to the one offered by Quantum Technologies, in Lake May, Fla. It can operate up to 5 MHz with a 120 msec risetime and it has an aperture of 3 mm, so it can accept a standard laser beam diameter.

A third alternative for shuttering the read beam is to use a pulsed diode laser for the read operation. The advantage of this method is that a diode is a current-driven device, so that the power output can be adjusted to the desired level electronically. Diode lasers operating at 680 nm in a single transverse mode are available from Spectra Diode Laboratories in San Jose, Calif. These diode lasers put out 30 mW in a beam diverging in a cone of 10° by 40° which can be collimated. They have a coherence length of about 1 cm, but for a read operation, this is of little importance. The bandwidth is about 3 nm (about 1000 times that of a HeNe), but this is also of little importance in this application.

The optional lamp used to erase the interferogram must have a high intensity, and must also be shuttered at the appropriate moments. For the current embodiment, a continuous wave (CW), compact, short arc Xenon lamp, similar to that manufactured by Optical Radiation Corporation (ORC) in Los Angeles, may be used. Such a lamp emits broadband radiation across the entire visible spectrum, with peaks in the 800 to 1000 nm region. However, there is sufficient emission in the blue pan of the spectrum, around the 412 nm peak of the M state, to filter unwanted light from the lamp, and still be left with an intensity high enough in the blue wavelengths to serve as an erase pulse. The smallest lamp available, the ORC 150, puts out about 24 mW/nm in this area of the spectrum. Using a Schott glass filter which allows wavelengths of $1<420$ nm to pass, there is more than enough light to erase the material between intefferograms.

The light from this lamp emerges at a 3° half-angle, so it must be focused to pass through another A/O modulator shutter.

CONCLUSIONS, RAMIFICATIONS, AND SCOPE

A versatile high resolution, real time, bacteriorhodpsin-based holographic imaging system that can be adapted to holographic applications, including holographic nondestructive testing and aero-optic imaging has been described. The resulting instrument can be applied to other holographic and non-holographic applications. For example, by choosing a slide with a suitable M state lifetime and optical density to fit an application, it would be possible to package the present camera system, and to adapt it to other situations that require a variety of video frame rates.

Although the examples given include many specifics, they are intended to be illustrative of only some of the possible embodiments of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A holographic camera comprising:

a camera body providing a wall having an exposure aperture for accepting incident light, into an operating space enclosed by the body;

a light sensitive, high-speed, self-erasing element in fixed operant relationship with the light incident on the aperture which receives and is affected by said incident light; the light sensitive element forming multiple-sequential holographic images at a rate of at least one image per hour;

means for directing a read light beam onto the light sensitive element to produce a diffracted read light beam within the operating space, image sensing means oriented within the operating space for receiving the diffracted read light beam produced by the read light beam, incident on the light sensitive element, for recording the diffracted light beam intensity pattern, the image sensing means, producing a time dependent electrical analog signal of the diffracted read light beam intensity pattern.

2. The apparatus of claim 1 wherein the light sensitive element is produced by a living organism.

3. The apparatus of claim 2 wherein the light sensitive element is bacteriorhodopsin.

4. The apparatus of claim 2 further including means of directing a write beam onto the light sensitive element to produce a holographic grating in the light sensitive element, and a spectral filter positioned for receiving and rejecting the incident write beam light passing through the light sensitive element.

5. The apparatus of claim 2 further including, as part of the image sensing means, an electrical signal to imagery forming means for transforming the electrical signal into an image, and wherein the image is a charge coupled device, and further including an electrical connector means for making the electrical analog signal available externally to a means of mass storage.

6. The apparatus of claim 4 further including a mass storage means for retaining the electrical analog signal as a time dependent function.

7. The apparatus of claim 5 wherein the mass storage means is a solid state electronic memory.

8. The apparatus of claim 2 further including a light sensor, within the operating space, the relative positions of the sensor and light sensitive element being adjustable so as to monitor intensity of the write and the read beams at various angles of incidence with respect to the normal to the light sensitive element.

9. The apparatus of claim 2 wherein the image sensing means is adjustably positionable within the operating space so as to accommodate diffracted signals from the read beam over a range of at least 45 degrees.

10. The apparatus of claim 6 further including an electronic data processing means interconnected with the mass storage means for processing the time dependent function into a drive signal for producing a dynamic video display of the time dependent function of the electrical analog.

11. A method for generating a dynamic display of time dependent physical changes in a subject, the method comprising the steps:

a) providing a camera body including an exposure aperture providing light beam access to an operating space enclosed by the body, and a light sensitive, self-erasing element in fixed operant relationship with the aperture, and a high resolution, planar, image sensing means including an image forming means and an image-to-electrical signal transforming means, positioned within the operating space;

b) projecting coherent write light beams onto a bacteriorhodpsin film plate to form a holographic diffraction grating on the film plate;

c) projecting a read light beam onto the film plate in superposition with the diffraction grating to form a diffracted holographic image;

d) sensing the diffracted read beam at the image sensing means;

e) producing a time dependent electrical analog of the diffracted beam.

12. The method of claim 11 further including the step of spectrally filtering the write light beam for rejection thereof from the operating space.

13. The method of claim 12 further including the step of storing the electrical analog in a mass storage means as a time dependent function.

14. The method of claim 11 further including the step of sensing the diffracted light beam so as to register the holographic image onto the sensor, producing a time dependent electrical analog of the diffracted beam; etc.

15. The method of claim 11 further including the step of processing the time dependent function into a drive signal for producing a motion picture video screen displayed model of the time dependent function of the electrical analog.

16. A high resolution real time camera for producing a record from a plurality of incident light beams, the camera including, a camera body for accepting incident light into an operating space enclosed by the body, a photosensitive photopolymer film in a fixed operative relationship to the camera body, first means for directing a plurality of incident light beams onto the film to produce in the film a diffraction grating, second means for generating a read beam and directing the read beam through the diffraction grating of the film and into the operating space to produce a diffracted light beam within the operating space, and third means within the operating space to record the diffracted light beam.

17. A camera as set forth in claim 16 in which the photosensitive photopolymer film is self developing.

18. A camera as wet forth in claim 17 in which the self-developing photosensitive photopolymer film is high speed.

19. A camera as set forth in claim 18 where the photosensitive photopolymer film is self-reversible.

20. A camera as set forth in claim 19 in which the photosensitive photopolymer film is bacteriorhodopsin-based.

* * * * *